Figure 1:
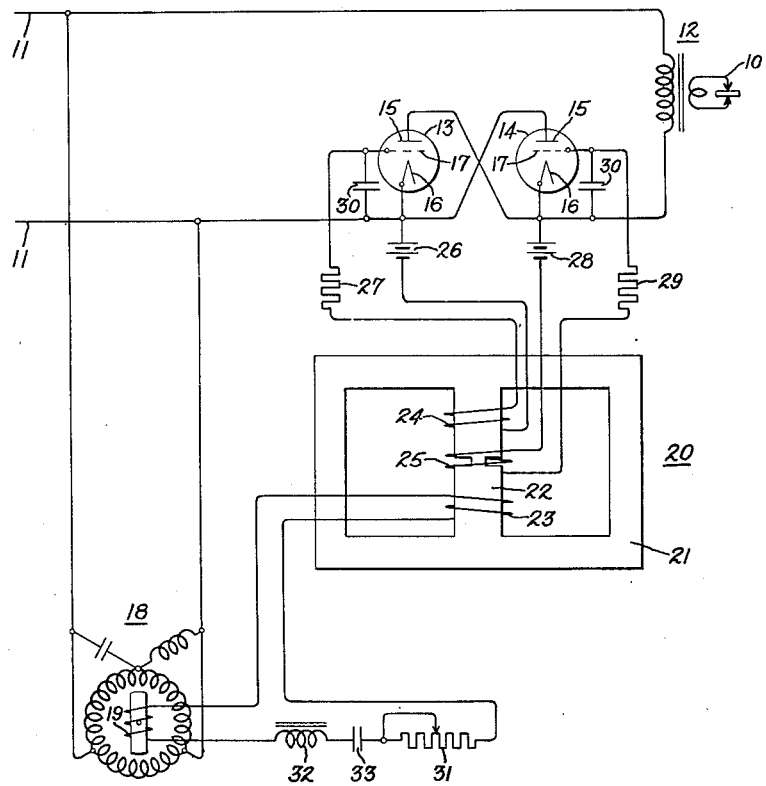

June 17, 1941.   L. G. LEVOY, JR   2,246,177
ELECTRIC CONTROL CIRCUIT
Filed Aug. 2, 1940

Inventor:
Louis G. Levoy, Jr.
by Harry E. Dunham
His Attorney.

Patented June 17, 1941

2,246,177

UNITED STATES PATENT OFFICE 2,246,177

ELECTRIC CONTROL CIRCUIT

Louis G. Levoy, Jr., Schenectady, N. Y., assignor to General Electric Company, a corporation of New York Application August 2, 1940, Serial No. 349,735

6 Claims. (Cl. 171—119)

My invention relates to electric control circuits and more particularly to circuits for controlling electric valve translating apparatus.

In many applications it is desirable to transfer energy between two electric circuits by means of electric valves having control members which are periodically energized to control some condition of the energy transfer between the circuits interconnected by the electric valves. Heretofore circuits have been proposed for applying periodic voltages of peaked wave form to the control members of electric valves to control the conductivity thereof. However, many of these arrangements have involved the use of an inordinate number of elements or the size and rating of these elements has been large compared with the electrical energy required for energization of the control members. Some of the circuits of the prior art have also been subject to the difficulty that their operation is not always uniform and that for a given setting of the control circuit the peaks produced by the circuit for energizing the control electrodes are not always effective to render the valves conductive at the same time in the anode-cathode voltage wave impressed thereon. In circuits employing reversely connected valves for energizing an alternating current load, such as a welding transformer, irregularities in the time of firing of the two valves causes a direct current component in the load circuit and resulting saturation of the transformer core which causes undesirable variations in the energy transferred to the welding circuit. In accordance with the teachings of my invention described hereinafter I provide a new and improved control circuit for electric valve translating apparatus in which the above-mentioned disadvantages are obviated.

It is an object of my invention to provide a new and improved control system.

It is another object of my invention to provide a new and improved control system for electric valve translating apparatus.

It is a further object of my invention to provide a new and improved control system for producing control voltages of peaked wave form which are unaffected by harmonics in the supply voltage and which requires peaking transformer means of relatively small size and cost.

In accordance with the illustrated embodiment of my invention electric valve translating apparatus interconnects an alternating current supply circuit and an alternating current load circuit such as a welding transformer. The electric valves are each provided with a control member which is excited by a periodic potential of peaked wave form produced by a control circuit embodying my invention. The control circuit includes a peaking transformer having a core including a central leg of metal such as a Nickaloy or mu metal having high permeability at low flux density and having a saturation curve with a sharp bend or knee. The central leg of the core is provided with a portion of reduced cross section which saturates to produce a voltage of peaked wave form in the secondary windings of the transformer which are wound thereon. The primary winding is also wound on the central leg of the core structure and is energized from a source of alternating current. In the particular embodiment illustrated the primary winding is energized from the alternating current supply circuit through a phase shifting network and a series resonant filter circuit tuned to the fundamental frequency of the supply. A resistor is also connected in series with the primary winding of the transformer. The tuned circuit offers considerable impedance to the higher harmonics of the alternating current supply. This is particularly important in connection with peaking transformers designed to have a very narrow secondary peaked voltage which is required for accurate control and in peakers in which the impedance of the primary circuit is predominately resistive as contrasted with peakers in which the primary circuit is predominately inductive.

My invention will be better understood by reference to the following description taken in connection with the accompanying drawing and its scope will be pointed out in the appended claims. In the drawing Fig. 1 is a schematic representation of one embodiment of my invention, and Fig. 2 represents certain operating characteristics of the circuit schematically illustrated in Fig. 1.

Figure 2:
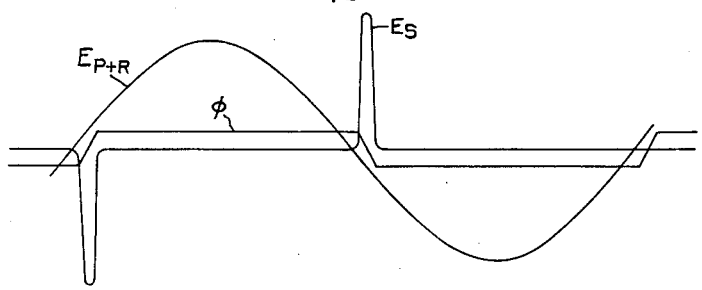

Referring now more particularly to Fig. 1, my invention is there illustrated as applied to an electric valve translating circuit for effecting energization of an alternating current load circuit, such as an alternating current welding circuit 10, from an associated alternating current supply circuit 11 through a transformer 12 and a pair of reversely connected electric valve means 13 and 14. The electric valve means 13 and 14 are preferably of the type employing an ionizable medium, such as a gas or a vapor, and each comprises an anode 15, a cathode 16 and a control member or grid 17.

For the purpose of energizing the control members 17 with periodic potentials of peaked wave form, I provide a control circuit which, in the particular embodiment illustrated, includes a phase shifting network 18 having a secondary or output winding 19 and a peaking transformer 20. The peaking transformer 20 includes a core structure 21 having a central leg 22 formed of a material having high permeability at low flux densities, such as Nickaloy or mu metal. The leg 22 of the core is provided with a section of reduced area or saturating portion which may be designed to give the desired width of peaked voltage wave. A primary winding 23 and secondary windings 24 and 25 are wound about the central core 22 so that substantially all of the flux of the saturable leg of the transformer links both the primary and secondary windings. The secondary winding 24 is connected to impress periodic voltages between the cathode 16 and control member 17 of electric valve means 13 by a circuit including a suitable biasing battery 26 and a current limiting resistor 27. Similarly, winding 25, biasing battery 28 and current limiting resistor 29 are connected in circuit with the control member and cathode of valve means 14. Capacitors 30 are connected between the control members 17 and the cathodes 16 to suppress undesirable transients in the excitation circuit.

The primary winding 23 of the peaking transformer is connected to be energized from the winding 19 of the phase shifting circuit 18 through a variable resistor 31 and a series resonant circuit including a nonsaturable inductive element 32 and a capacitor 33. The resonant circuit is tuned approximately to the frequency of the supply circuit so that it offers substantially no reactive impedance to the fundamental frequency and eliminates undesirable harmonics. The resistor 31 functions to limit the current drawn by the primary winding 23 and absorb the difference in voltage between the voltage of winding 19 of the phase shifting network and the voltage impressed on the terminals of winding 23.

By placing both the primary and secondary windings of the peaker on the core structure in such a manner that substantially all of the flux produced in the saturable portion of the transformer links both the primary and secondary windings, it is possible to produce a peaking transformer construction which is very small for a given electrical output as compared with those peaking transformer constructions in which a large portion of the primary flux is shunted through an additional leg of the core during the periods of time when the saturable leg of the transformer is saturated. By utilizing a resistor to control the current drawn by the primary winding it is possible to render the primary circuit of the transformer highly resistive so that the primary current and flux are more nearly in phase with the voltage impressed on the primary circuit and in this manner it is possible to obtain the voltage peak in the first quadrant of the anode-cathode voltage without any additional phase shifting means. In the circuit shown a phase shifting network has been illustrated in which a movable element is employed. However, in many cases it is possible to dispense with this circuit entirely or because of the low energy requirements of the peaking transformer construction illustrated, it may be of the entirely static type. By detuning the series resonant circuit including the inductive impedance element 32, the transformer primary winding and the capacitor 33 it is possible to obtain in the order of a 30-degree shift in phase of the voltage peak produced in the secondary winding 27 without materially affecting the magnitude of the peak and in some cases this method of phase shift may be sufficient to take care of the range of operating conditions encountered. When the circuit is detuned the resistor may be varied to obtain phase shift of the secondary voltage peak but preferably the resistor is used primarily for magnitude control. Of course, when the circuit, including the inductance and capacity is tuned to fundamental frequency, the variation of the resistor is only effective to control the magnitude of the voltage impressed on the primary winding.

In many applications such as the welding circuit illustrated, it is desirable that both electric valves fire at the same time in the anode-cathode voltage wave so that no direct current component is introduced in the welding transformer. Otherwise, the direct current component tends to saturate the welding transformer and the desired uniformity of operation is not obtained. When it is desired to control the firing of electric valves with considerable accuracy it is desirable to utilize peaking transformers with a very narrow secondary peaked voltage wave for energizing the control electrode of the electric valves. However, when utilizing transformers which produce a narrow peak it has been found that the operation is often much less consistent than would be expected. I have found that much of this erratic operation may be traced to the presence of higher harmonics in the alternating current supply which tend to distort and shift the peak induced in the secondary winding by variable amounts depending upon the magnitude, phase relation and order of the harmonics. That the harmonics will cause considerable difficulty when using a narrow secondary peak, such as for example, is apparent when it is considered that the 27th harmonic spans 13.3 electrical degrees. Since the rate of change of the higher harmonics is very great for a given magnitude as compared with that of the fundamental the effect on the induced voltage of these harmonics is marked. The undesirable effect of harmonics is particularly pronounced in circuits in which the peaking transformer primary circuit is highly resistive. For this reason, I provide the series resonant circuit including the inductance impedance element 32 and capacitor 33 and the inductance of the transformer primary winding to remove these harmonics and have found that the operation of the peakers is much more consistent.

It is believed that the operation of the illustrated electric valve circuit and the control circuit embodying my invention will be readily understood by those skilled in the art in view of the detailed description given above. The valves 13 and 14 are rendered normally nonconductive by the biasing batteries 26 and 28 and are periodically rendered conductive at a predetermined point in the anode-cathode voltage by the peaked voltages produced in the secondary windings 24 and 25 of the transformer 20. The operation of the peaking transformer circuit may be better understood by reference to Fig. 2 in which curve $E_{P+R}$ represents the sinusoidal voltage impressed on the circuit including the resistor 31 and the primary winding 23 and with the exception of the harmonics which have been eliminated by the filter circuit, this voltage is substantially the output voltage of the winding 19 of the phase shifting circuit 18. If, as suggested in the specification, in some installations the phase shifting circuit is eliminated this voltage will be substantially the same as the supply voltage with the harmonics removed by the filter circuit. Inasmuch as the circuit including the resistor 31 and the primary winding 23 is predominately resistive, the flux wave will be substantially in phase with the voltage $E_{P+R}$. In Fig. 2 the flux wave $\theta$ has been shown as slightly lagging the voltage $E_{P+R}$ but it is to be understood that this flux wave may be in phase coincidence with the voltage wave $E_{P+R}$ or it may be made to lead this voltage if the circuit is detuned slightly so that the capacitive impedance predominates. As indicated in Fig. 2, the flux wave $\theta$ is flat topped and as is well understood, the width of the secondary voltage peaks Es is determined by the width of the flux wave during the flux changes. With the particular type of peaker construction of the present invention the primary flux and secondary flux are substantially the same and both have been indicated in the drawing by the single curve designated $d$. As is well understood, the voltage peak produced may be reversed 180 degrees with respect to the anode-cathode voltage by proper connection of the secondary transformer windings with the control electrodes of the electric valves with which they are associated.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. A circuit for producing periodic voltages of peaked wave form comprising a source of periodic potential, a transformer including a primary winding, a secondary winding and a core structure having a saturable portion, resistance means connected in series with the primary winding of said transformer and having a magnitude sufficient to render the impedance of said resistance means and said transformer primary predominantly resistive, said primary winding and series connected resistor being connected to said source of periodic voltage, and filter means connected in circuit with said source and said primary winding for preventing harmonic voltages from being impressed on said primary winding.

2. A circuit for producing periodic voltages of peaked wave form comprising a source of alternating current voltage, a transformer including a primary winding connected to said source of voltage, a secondary winding and a core structure having a saturable portion, a series resonant circuit connected in series with said primary winding for eliminating the harmonics impressed on said primary winding to prevent distortion and phase shift of the peaked voltage induced in said secondary winding, and resistance means connected in series with said primary winding for limiting the current drawn thereby.

3. A circuit for producing periodic voltages of peaked wave form comprising a source of alternating current voltage, a transformer including a primary winding connected to said source of voltage, a secondary winding and a core structure having a saturable portion, a capacitance in series with said primary winding for tuning said winding substantially to the fundamental frequency of said source, and resistance means connected in series with said primary winding for controlling the amplitude of the voltage impressed thereon.

4. A circuit for producing periodic voltages of peaked wave form comprising a source of alternating current voltage, a transformer including a primary winding connected to said source of voltage, a secondary winding, a core structure having a portion thereof saturable for a predetermined portion of the alternating current flux wave produced by the alternating current in said primary winding, each of said windings being wound upon said core structure so that substantially all of the flux in said saturable portion links both of said windings, and resistance means connected in series with said primary winding for rendering said primary circuit predominately resistive.

5. A circuit for producing periodic voltages of peaked wave form comprising a source of alternating current voltage, a transformer including a primary winding connected to said source of voltage, a secondary winding, and a core structure having a portion thereof saturable for a predetermined part of each cycle of the alternating current flux wave produced therein by the alternating current in said primary winding so that periodic voltages of peaked wave form are induced in said secondary winding, said windings being wound on said core structure so that substantially all of the flux in said saturable portion links both of said windings, filter means associated with said source of periodic voltage and said primary winding for preventing harmonic voltages from being impressed on said primary winding to minimize distortion and phase shift of the peaked voltages induced in said secondary winding.

6. A circuit for producing periodic voltages of peaked wave form comprising a source of alternating current voltage, a transformer including a primary winding connected to said source of voltage, a secondary winding and a core structure having a saturable portion, said windings being wound on said core structure so that substantially all of the flux in said saturable portion links both of said windings, a series resonant circuit connected in series with said primary winding and tuned to the frequency of said alternating current circuit for eliminating the harmonics impressed on said primary winding to prevent distortion and phase shift of the peaked voltages induced in said secondary winding, and resistance means connected in series with said primary winding for limiting the current drawn thereby.

LOUIS G. LEVOY, Jr.